(12) United States Patent
Jurewicz, Jr.

(10) Patent No.: US 7,272,464 B1
(45) Date of Patent: Sep. 18, 2007

(54) APPARATUS AND METHOD FOR MOBILE COMPUTER-AIDED DESIGN

(76) Inventor: John J. Jurewicz, Jr., 5403 E. Lakeshore Dr., Wonder Lake, IL (US) 60097

( * ) Notice: Subject to any disclaimer, the term of this patent is extended or adjusted under 35 U.S.C. 154(b) by 0 days.

(21) Appl. No.: 11/472,689

(22) Filed: Jun. 22, 2006

(51) Int. Cl.
*G06F 19/00* (2006.01)

(52) U.S. Cl. ............ 700/182; 709/229; 370/316; 296/37.6

(58) Field of Classification Search ............ 700/90, 700/159, 182; 709/202, 227–229; 455/3.01, 455/39, 445, 552.1, 557; 296/37.6
See application file for complete search history.

(56) References Cited

U.S. PATENT DOCUMENTS

| | | | |
|---|---|---|---|
| 6,580,623 B1 | 6/2003 | Williams et al. | |
| 6,606,744 B1 * | 8/2003 | Mikurak | 717/174 |
| 6,633,900 B1 | 10/2003 | Khaless et al. | |
| 6,671,818 B1 * | 12/2003 | Mikurak | 714/4 |
| 6,826,405 B2 | 11/2004 | Doviak et al. | |
| 6,981,047 B2 | 12/2005 | Hanson et al. | |
| 6,992,991 B2 * | 1/2006 | Duske et al. | 370/316 |
| 7,048,320 B2 | 5/2006 | Rubel et al. | |
| 7,049,799 B2 | 5/2006 | Sugiura | |
| 7,124,101 B1 * | 10/2006 | Mikurak | 705/35 |
| 7,130,807 B1 * | 10/2006 | Mikurak | 705/7 |

* cited by examiner

*Primary Examiner*—Leo Picard
*Assistant Examiner*—Douglas S Lee

(57) ABSTRACT

A mobile computer aided design apparatus is disclosed comprising a vehicle (100) that includes an engine (102) and a cab (104). Inside the cab is a computer aided design workstation (106). The workstation is coupled to a router (108) wherein the router includes a first wireless communication transceiver (110), a second communication transceiver (112), a third communication transceiver (114). The router is coupled to an antenna system (116). An uninterruptible power supply (118) is coupled to the computer aided design work station, the router, and to the engine. A plotter (120) is coupled to the workstation and carried in the vehicle.

18 Claims, 6 Drawing Sheets

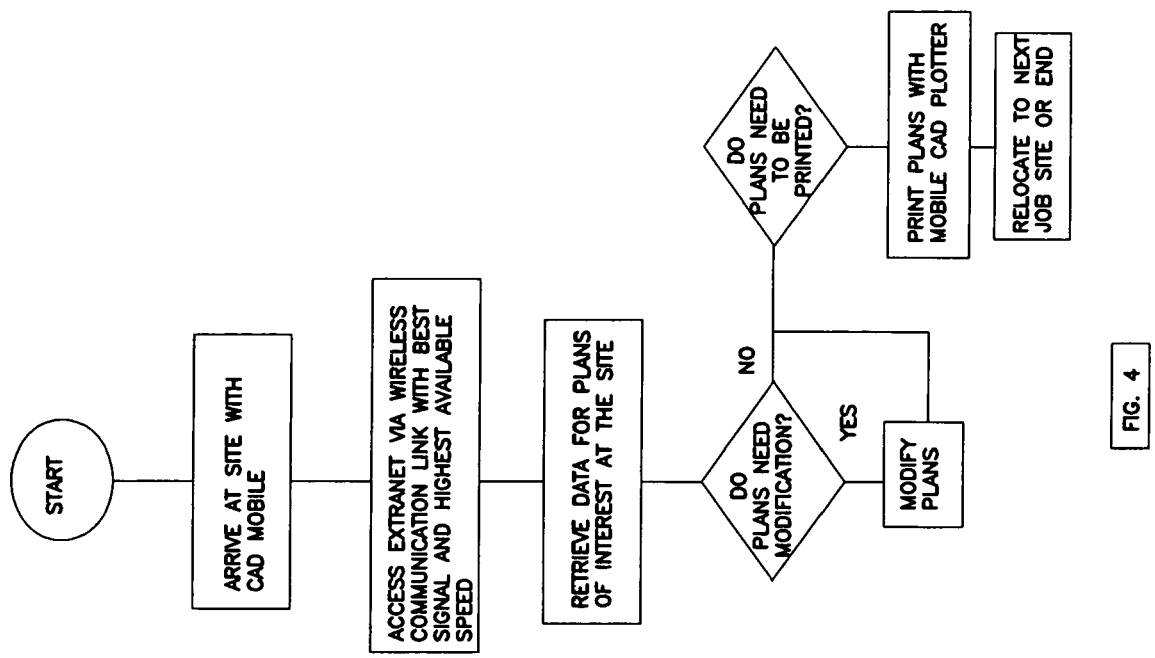

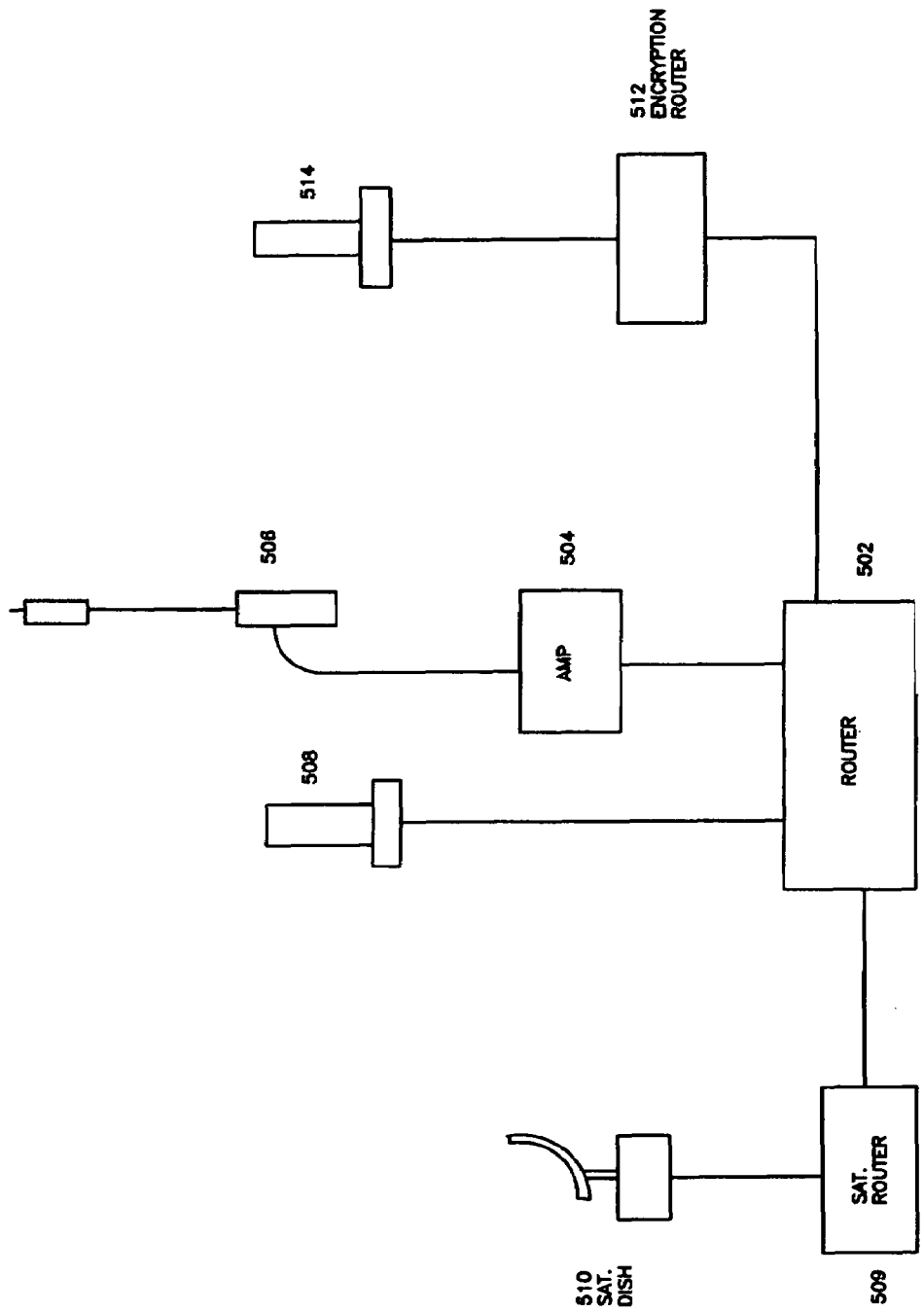

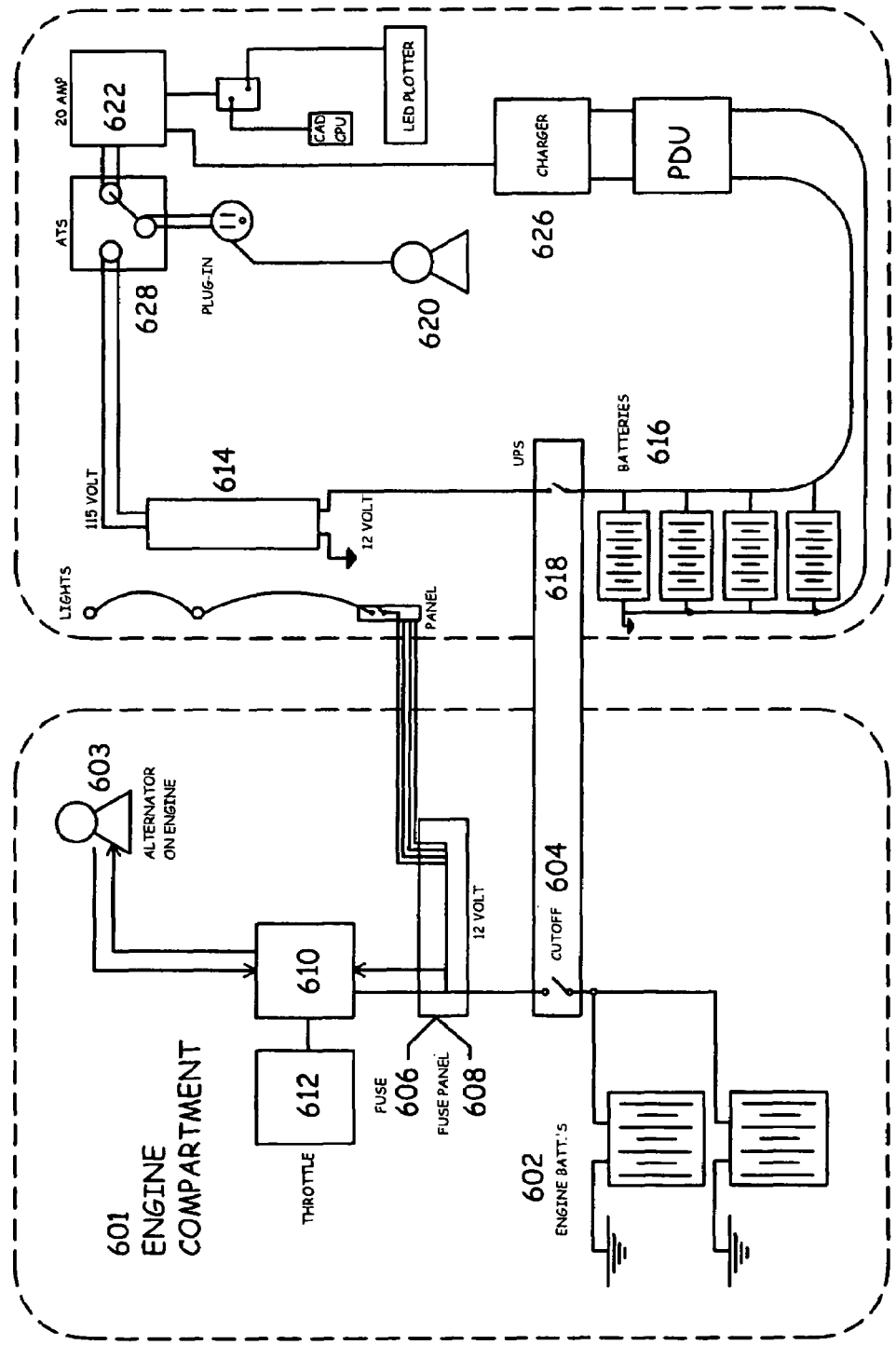

APPARATUS AND METHOD FOR MOBILE COMPUTER-AIDED DESIGN

FIELD OF INVENTION

The invention is related generally to computer-aided design and more particularly to mobile computer aided design.

BACKGROUND

Computer-aided design (CAD) is ubiquitous in the design industry and is used to design all things from toys to electronic circuits. CAD is prevalent in the construction industry for developing building plans, landscaping and the like. Architects and engineers use CAD for high power drafting to provide the builders with prints of the design having the required details necessary to build the structure. These systems are generally workstations with high-speed data processing capabilities as the level of detail necessary in the drawings requires high resolution and often 3-dimensional views thereof.

In general, the developer will bring the general requirements for a design to the architect. The architect takes the general requirements and designs the structure incorporating proper engineering, structural requirements and esthetics. However, it is not possible for the designer to take into account all circumstances that arise on the job site during planning and construction. For example, when the excavator removes soil in order to places a foundation, even with soil tests, the soil may not have the requisite structural characteristics necessary for the designed structure. The builder then must bring this information back to the architect in order to modify the plans accordingly. Once the plans are modified, they are brought back to the site and to all the subcontractors affected in order to build according to the new plan. This adds considerable time and cost to the project.

The plans used for construction are very large, generally printed on 24 inch by 36 size paper so that the level of detail necessary is in easy readable form. The architect prints out the various plans, usually having multiple sheets per plan and even upwards of seven to ten sheets. Each subcontractor needs a set of plans, which increases the total number of sheets by each subcontractor.

Therefore there is a need for an improved apparatus and method for CAD to improve both efficiency and cost.

BRIEF DESCRIPTION OF THE DRAWINGS

The figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 illustrates a method of operating the mobile CAD station.

FIG. 5 illustrates an antenna system of the mobile CAD station.

FIG. 6 illustrates an uninterruptible power supply.

Figure 1:
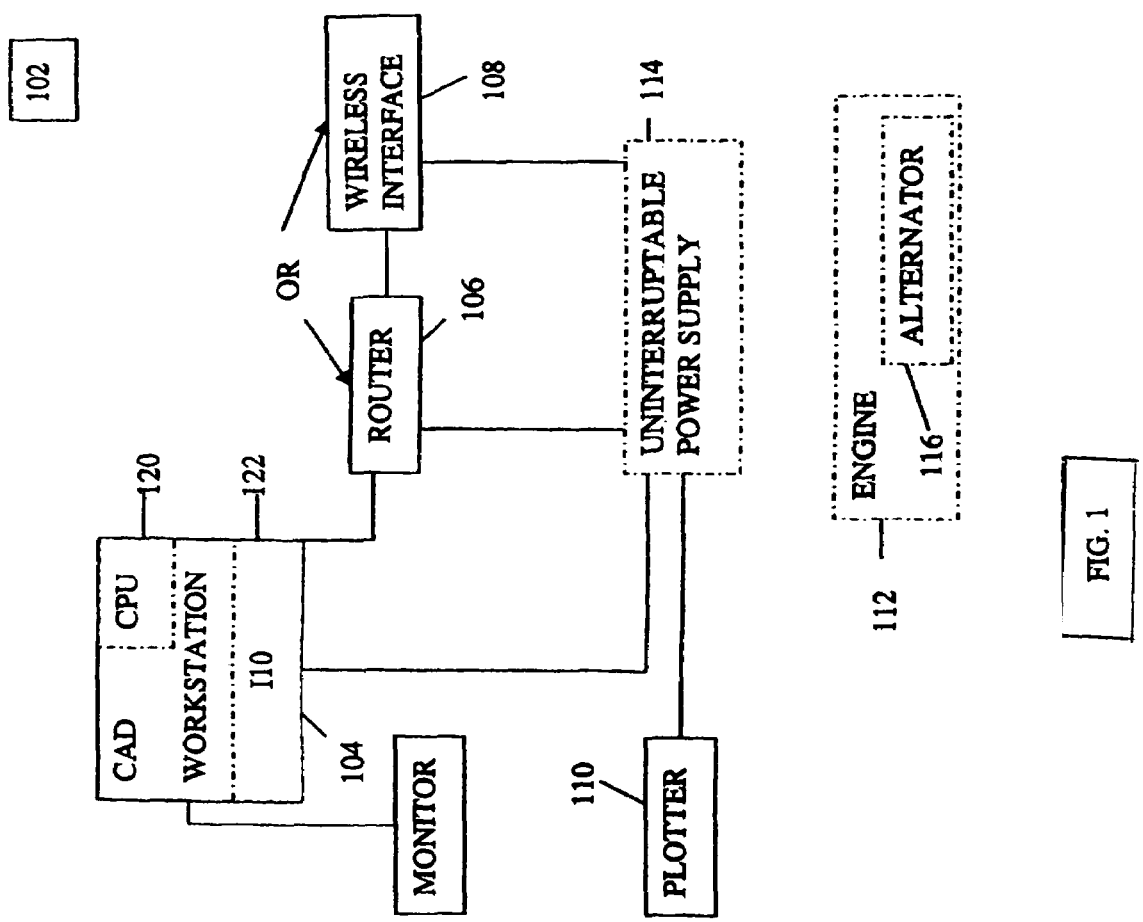
FIG. 1 illustrates a block diagram of the mobile CAD station of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

While the present invention is achievable by various forms of embodiment, there is shown in the drawings and described hereinafter several examples of embodiments. Understand that the present disclosure is to be considered an exemplification of the invention and is not intended to limit the invention to the specific embodiments contained herein, as will become more fully apparent from the discussion below. It is further understood that the mobile CAD apparatus of the present invention may be used more generally in any application where it is desirable to provide mobile computer design.

Before describing in detail exemplary embodiments that are in accordance with the present invention, it should be observed that the embodiments reside primarily in combinations of method steps and apparatus components related to the mobile CAD system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention.

It is further understood that the use of relational terms, if any, such as first and second, top and bottom, and the like are used solely to distinguish one from another entity or action without necessarily requiring or implying any actual such relationship or order between such entities or actions.

A mobile computer aided design (CAD) apparatus and method is disclosed. The mobile CAD system comprises a vehicle such as a van an ambulance, a recreational vehicle stationary trailer or the like, which carries a CAD workstation, a router, a wireless air interface coupled to the router, and a plotter coupled to the CAD workstation. The plotter has a plurality of alternating and direct currents supplied thereto. In one exemplary embodiment, the mobile CAD apparatus comprises an uninterruptible power supply coupled between an alternator of an engine of the vehicle and the CAD workstation, the router and the plotter. The wireless air interface comprises a plurality of wireless communication devices having transceivers for communication with remote stations. The plurality of wireless communication devices is coupled to an antenna system.

The CAD workstation is coupled, via the wireless communication interface to an extranet or internet. An extranet is understood to be an application service provider such yahoo email. This allows the mobile CAD workstation to travel from job site to job site and access design information over the extranet substantially instantaneously. Changes may then be made to the design, on-site, and new prints provided from the plotter immediately to the builder.

FIG. 1 illustrates an exemplary mobile CAD system in block diagram form. The mobile CAD system 100 comprises a vehicle 102 which houses mobile CAD equipment including a CAD workstation 104, a router 106, a wireless interface 108, and a plotter 110. The CAD workstation is coupled to the router 106 and the plotter 110. The plotter has stabilization hardware where it mounts to the vehicle to prevent damage to the LED Prism and other components during transit. Prisms are common in LED plotters and known to those skilled in the art. This stabilization hardware is used to secure the equipment during motion of the mobile CAD system.

The wireless interface 108 is coupled to the router 106. The vehicle 102 in general may be a van or the like which comprises an engine 112 to power the vehicle transmission and to provide power to the CAD workstation 104, the router 106, the wireless interface 108 and the plotter 110. Alternatively an uninterruptible power supply 114 is coupled between the alternator 116 of the engine 112 and the CAD workstation, the plotter 110, the router 106 and the wireless interface 108. The uninterruptible power supply 114 provides power to the mobile CAD equipment when the vehicle engine 112 is turned off.

The CAD workstation 104 comprises a CPU 120, an I/O interface 122 and a monitor 124. The router 106, the plotter 110 and the monitor 124 are coupled to the CPU through the I/O interface 122. In this embodiment, the I/O interface 122 includes a serial port, a parallel port and a monitor output, which may be a VGA, DVI or HDMI output or the like.

Figure 2:
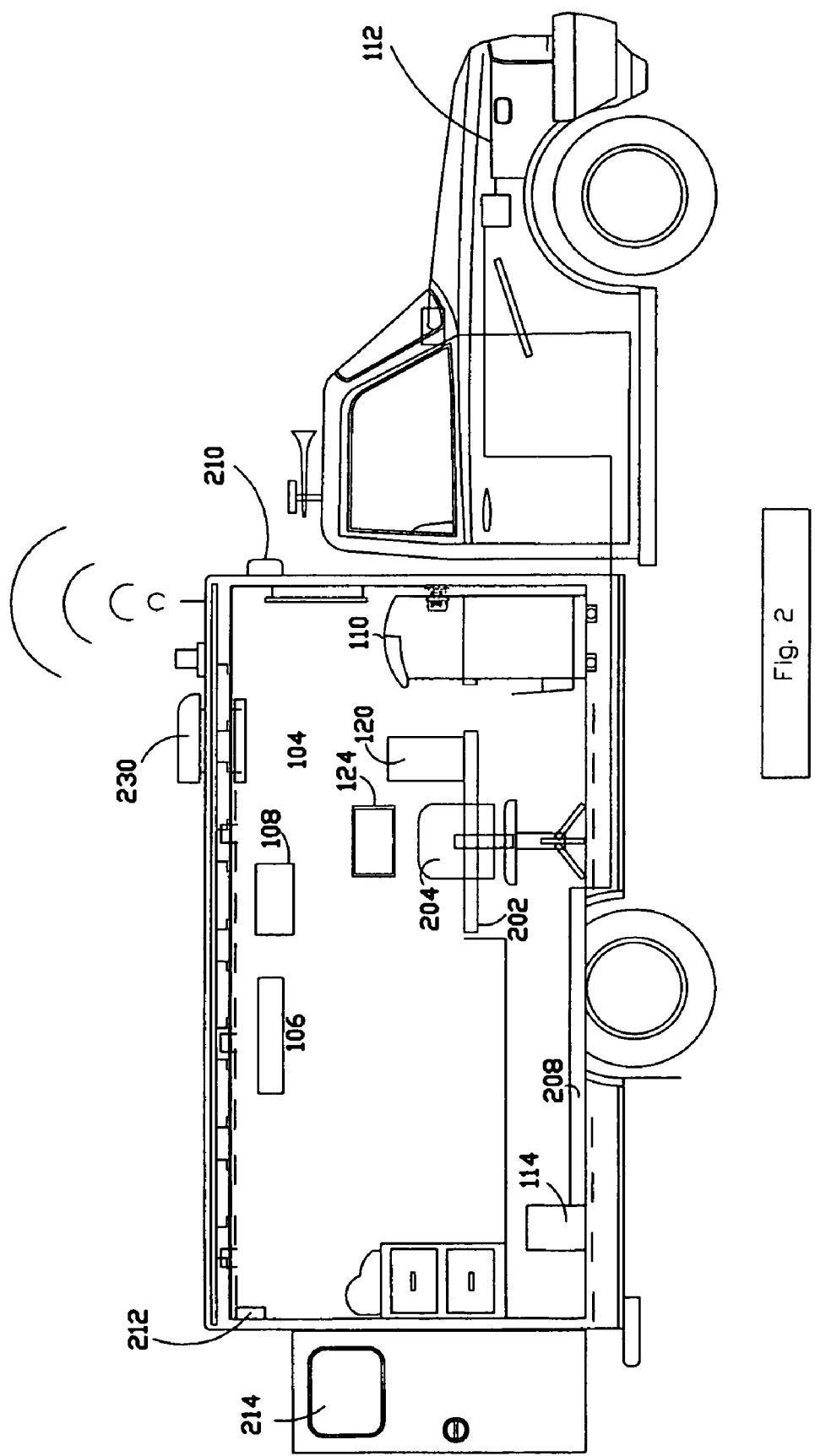
FIG. 2 illustrates a cross sectional view of the mobile CAD station.

FIG. 2 illustrates a cross sectional view of the mobile CAD vehicle 102. The vehicle 102 includes a desk 202 or the like, and a chair 204. The CAD workstation 104 is secured in the vehicle 102 and is setup in a typical workstation configuration. The desk 202 and a chair 204 are provided in payload portion 206 of the vehicle 102. The CPU 120 and the monitor 124 are secured to the desk 202. The plotter 110 is securely fixed to the vehicle 102, the floor 208 of the vehicle in this exemplary embodiment, so as to not move during transportation from one location to another. It is to be understood that the plotter may be fixed to any portion of the vehicle as long as it is secured. The plotter 110 may also be selectively secured and allowed to move such as when the vehicle is stopped and parked at a job site. In this embodiment, the plotter 110 may be moved into position for ergonomic convenience while on the job site and then locked into place during transport.

In one embodiment, the plotter includes an internal toner cleaning system. In this example, the internal toner cleaning system is a vacuum system coupled to the plotter to remove excess toner from a portion of the plotter surrounding the drum. The internal toner cleaning system is activated by a switch after the vehicle is in motion and stops to perform the work.

The plotter may also be connected to a dedicated alternator. The dedicated alternator is coupled directly to a plotter imaging heat element. The plotter may include multiple imaging heat elements or a single imaging heat element. This allows for efficient operation of the plotter without drain on the other electrical portions of the system Multiple monitors may be carried by the CAD mobile. For example, a second monitor 210, such as a flat panel LCD, plasma, DLP or like, may be carried at the front of the payload portion for viewing by a plurality of people during a review or modification meeting for example. The second monitor as well as other monitors may be coupled to the CAD workstation 104 and may be placed throughout the inside or outside of the CAD Mobile to provide viewing by as many people as possible. A banner display module 212 may be placed in the payload portion 206, above the back door 214 for example, to display status information, time, date, jobsite information weather information, or the like. The banner display module 212 may be an LED display or similar type device.

Figure 3:
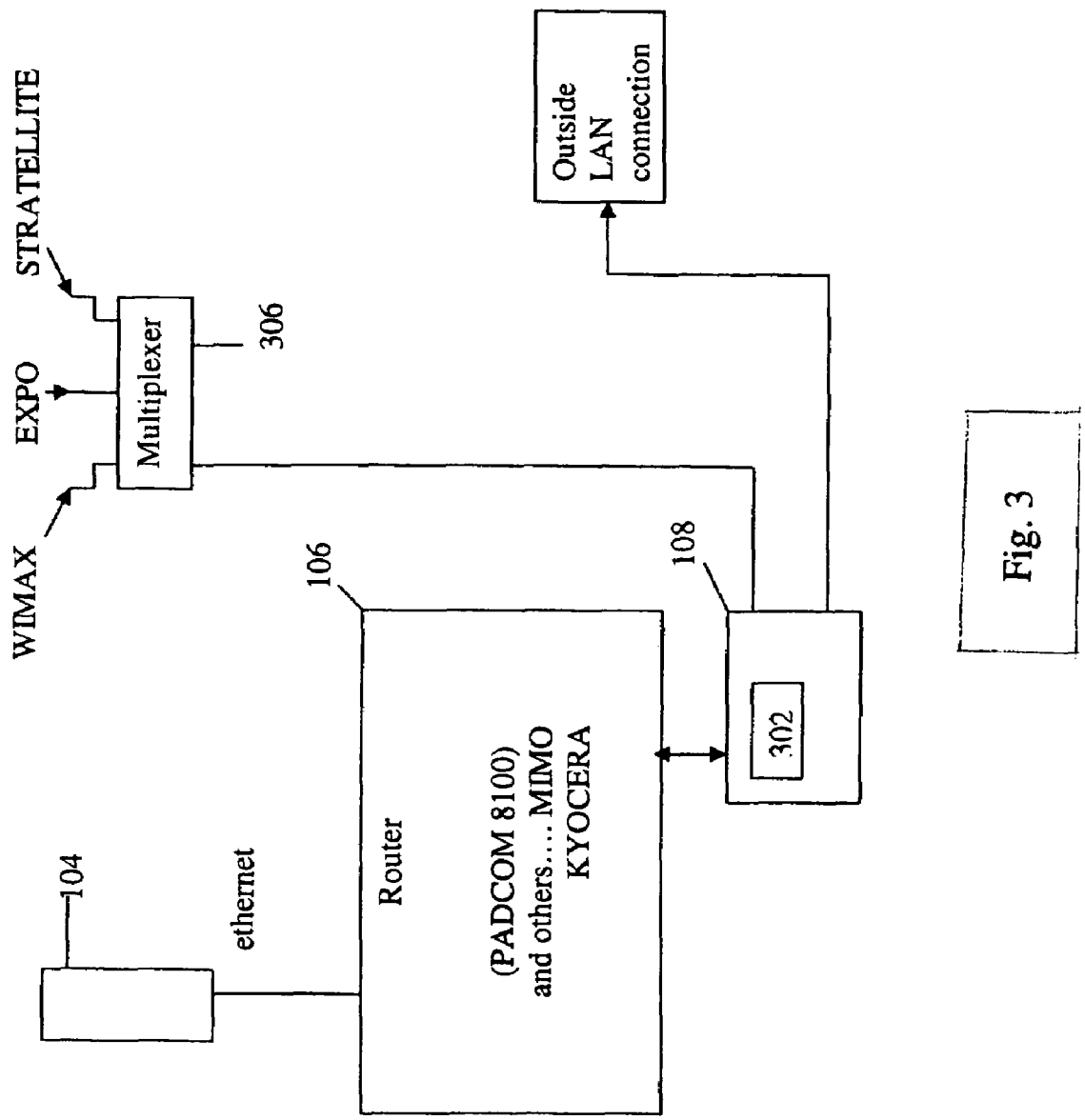
FIG. 3 illustrates a router 106 coupled to a wireless interface.

FIG. 3 illustrates the router 106 coupled to the wireless interface 108. The wireless interface 108 may be integral to the router or an independent unit coupled to the router 106 (e.g. PCMCIA card or the like). In the exemplary embodiment the wireless interface 108 comprises a transceiver 302 for communicating with a remote station (not shown). In this embodiment the wireless interface 108 communicates with a plurality of wireless communication networks using a plurality of wireless communication protocols. In this embodiment, the wireless communication interface 108 may communicate with a radiotelephone network, a 802.xx type network, a satellite network, or a stratollite network. This ensures that a connection between the CAD workstation and the server, e.g. extranet, is available as often as possible and with the highest data exchange rate possible. In this embodiment, the radiotelephone network is an EVDO network having higher data rates than a CDMA 1× or an original CDMA network. Other cell phone network may include global system for mobile communication (GSM), EDGE, GPRS, UMTS. WCDMA or the like. This allows for high data rate to exchange large amounts of data typical with CAD files. The 802 type network may be 802.11a/b/g, a 802.16 (WiMax) or the like. The router determines which network has the highest speed and the best signal strength and automatically selects which network to transfer data over. The network to be used may also be manually selected by an operator of the system.

The wireless communication interface may be linked, i.e. be in communication with, one or more networks at a time, however in this example, data is transferred over one network at a time. For example, the wireless communication interface may be coupled to and monitoring wireless link conditions of a 802.11g access point and a CDMA network, determining the signal conditions of each, all while exchanging data with a 802.16 network because at the time of the data transfer initiation, the 802.16 link was the best and the fastest. It should also be noted that the wireless communication interface 108 may be manually switched between one network and another. For example, if a free 802.11g hot spot is available and the data speeds are sufficient, the user may wish to choose this option manual over a fee-based service such as the cellular phone system even though the data rates achievable are much faster. The wireless communication transceivers are for communicating with an extranet to send and receive CAD files depending on which transceiver of the plurality of transceivers has the best communication link. This may also be automated in one alternate embodiment.

A multiplexer 306 is coupled between the wireless interface and a plurality of antennas 310. Each of the plurality of antennas is configured to operate within a desired bandwidth in accordance with a particular communication system. One antenna may operate in multiple bandwidths or a single bandwidth. The antennas are mounted to the roof of the CAD mobile in this exemplary embodiment, but it is understood that other locations for the antennas is possible.

In an alternative embodiment, the wireless interface comprises a plurality of transceivers or a transceiver that can operate in multiple communication systems. For example, the router may be coupled to multiple wireless modules such as a 802.11 module, a CDMA EVDO modules and a satellite module.

FIG. 4 illustrates a method of operating the mobile CAD station. In this exemplary flow diagram, the CAD mobile arrives 402 at a destination. The CAD mobile, with the workstation 014 and router 106, accesses 404 the extranet 220 via at least one of the plurality of wireless communication protocols. In this exemplary embodiment, the wireless link having the highest data rate and best signal strength is used, although a plurality of communication systems may be available. A script that runs in the router or the workstation 104 may control. Wireless communication system is used to connect to the extranet for data transfer and automatically switch from one network to another. The automatic switch operation is based on a script that reduces data transfer charges.

Data is retrieved 406 for the plans of interest at the site from the extranet. The plans then may be viewed on of a plurality of monitors on the CAD mobile. Information collected at the job site may be used to modify that plans. It is determined if the plans need modification 408. The plans may be modified 410 with the workstation 104. If the plans do not need to be modified, it is then determined 412 if they need to be plotted. This is also the case if the plans are modified. Once the plans are modified plotted, or viewed, or any combination thereof, the modified data may be uploaded to the extranet. If the data is directly accessed from the extranet, the modifications are saved. The CAD mobile may then relocate to the next jobsite and establish or maintain wireless communication. Once at the new or second job site, the process as described above may be repeated. Having access to the extranet allows the planners and designers and builders instant access to the data and the ability to change, view and plot the plans at the job site.

The data does not necessarily need to be exchanged with the CAD mobile at the actual location, i.e. the job site. For example, the data may be downloaded when the CAD mobile is at a WiFi hot spot with a desirable high speed data connection that is along the route to the particular location. Then the CAD mobile may travel to the job site and plot, view, make changes on location. Once complete, at the job site, if the plans were modified, the CAD mobile can in-transit or within wireless range of a communication system, upload the modified data.

FIG. 5 illustrates a dual antenna system of the mobile CAD station. The concept of "diversity receive" is important with the EVDO technology used by the mobile cad station. Most EVDO devices support two receiver antennas, and only one of them will be used to transmit. One configuration is a pair of standard CDMA external antennas to optimize connection speed. Cards like the Kyocera Passport, for example, have (2) external ports for this reason. The cadmobile utilizes (2) externally mounted antennas with a cyfre or intelligain dba-819 amplifier for optimum performance.

The router 502, which may be the router 106 as discussed above, is coupled to a plurality of antennas. The router 502 may be coupled directly to each antenna, one for each communication system, or a switch or multiplexer or amplifier or any combination thereof may couple the antennas to the router. In one embodiment a dual band antenna 506 is coupled to an amplifier 504 and then to the router 502. The dual band antenna 506 is tuned operate at about the 800 MHz (CDMA) band and the 2.0 GHz Band, 1850 to 1990 MHZ for example. A 802.11 antenna 508 is coupled to the router 502 for operation in the WiFi, WiMax, or Stratellite operational frequency bands. In the embodiment shown, an optional satellite dish 510 is coupled to a satellite router 509, which is coupled to the router 502. Also shown is an optional encrypted router 512. The encrypted router 512 is coupled to an antenna, which may any antenna to operate at a frequency for the desired encrypted network for example.

FIG. 6 illustrates an exemplary block diagram of an uninterruptible power supply system for the CAD mobile. In this embodiment, the engine compartment 601 houses a battery 602, of the engine 603, which is coupled to a cut-off switch 604. The engine compartment 601 may have one battery or a plurality of batteries as in the embodiment illustrated here. The cut-off switch 604 is coupled to a fuse 606 in a fuse panel 608. The fuse 606 is also coupled to a generator CPU 610. The generator CPU 610 controls the engine based on the load with the fuel throttle 612. The fuel throttle 612 is coupled to the engine 604. The cut-off switch is a double pole switch in this exemplary embodiment. The cut-off switch 604 is also coupled between an inverter 614 and a second battery 616. In this embodiment the cut-off switch is a solenoid that is activated by an engine switch (not shown). The cut-off 604 switch may also be a manual switch or the like. The cut-off switch opens the circuit between the first battery 602 and the fuse 606. The cut-off switch also opens the circuit between the second battery 616 and the inverter 614. Opening the circuit between the first battery 602 and the fuse 606 prevents the batteries from being drained when the CAD mobile is not in use. Opening the circuit between the inverter and the second battery 616 prevents the second battery from being drained when the CAD mobile is not in use.

The inverter 614 has a 3000 watt continuous rating and 6000 watts peak rating and supplies 115 volt AC in this embodiment. It is understood that a generator with different power supply capabilities may be used. The inverter is coupled to a solenoid activation switch 618 that is coupled to a second generator 620. The solenoid activation switch 618 is located in a side compartment of the cab for example. The power source switch 618 in this embodiment allows the CAD equipment to be powered by either the first generator in the engine compartment 601, which is coupled to the inverter 614, or by the second generator 620. The switch 618 is coupled to a breaker box 622. An automatic transfer switch (ATS) 628 is coupled between the inverter 614 and the breaker box 622. The ATS 628 has an electrical outlet 630 which in this embodiment is coupled to a second generator 620. The ATS 628 will switch between the second generator and the first generator. This allows for the load to be removed from the first generator 612, which is the alternator that is coupled to the engine 603. For example, the engine may be turned off and then the CAD workstations 104 and peripherals are powered by the second battery 616 or the second generator 620. The ATS 628 switches automatically and seamlessly without interruption in power to the system.

The CAD Workstation 104, the plotter 110, other monitors and printers are coupled to the breaker box 622 via a power strip (not shown) in this embodiment. The breaker box 622 is coupled to a charger, trickle charger, and a photoelectric charger 626. The trickle charger and optional photoelectric, e.g. photovoltaic cell, maintain a charge in the battery. In this embodiment, the solar panels, i.e. the photocells are located on the roof of the CAD mobile.

In one embodiment, the air conditioning unit for the payload portion 206 is couple to a third generator (not shown). Current draw from the air conditioning can be large and therefore have undesirable effects on the CAD workstation 104. A separate air conditioning generator allows the air conditioning unit 230 to be operation without an effect on the electronics inside the payload portion 206.

In an alternate embodiment, the CAD workstation is comprised of modules. A CPU module, a storage module (e.g. hard drive or removable media), router module, an upgrades graphics accelerator card. The storage module is storage media or the like, hard drives in this embodiment, that are mounted to the vehicle with a shock absorption system to the vehicle. The shock absorption system prevents the storage media from be damaged during vehicle motion. These modules are further engaged to the payload bay independently. This allows for example, storage modules to be removed easily from the payload portion. For example, the storage module can be removed from the CAD mobile and brought into the office and then coupled to another workstation. A larger storage module may also replace the current storage module. Additional storage module may also be incorporated.

Each module, the storage module, the CPU module, the router module, may slide in a mount with latches or screws such as in a standard 19 inch rack mount system or a custom rack system. The latches may be quick release or the like. There may be an entire bay of storage modules to allow for storage capacity expansion for example.

In this embodiment the mobile CAD system comprises a vehicle having a payload portion. There is a CPU module carried in the payload portion. A memory module coupled to the CPU module and carried in a bay of the payload portion. A wireless communication module is coupled to the CPU module and a monitor is coupled to the CPU module. The system also includes an uninterruptible power supply that is coupled to the CPU module, the wireless communication module, and the monitor. An antenna array is coupled to the wireless communication module and may be positioned on a roof of the vehicle or internally. The system also includes a first generator, a second generator, an inverter coupled to the first generator, a power source switch coupled between the inverter and the second generator and a cut-off switch coupled between a first batter and a fuse and the cut-off switch coupled between a second battery and the inverter. Inside the payload portion is a plotter coupled to the workstation and fixed to the payload portion.

In this exemplary embodiment, the vehicle has a cab and a payload portion. The vehicle described herein is a representation of the type of vehicles that may benefit from the present invention. However, it is to be understood that the present invention may be applied to any type of vehicle, but not limited to, the following devices: cars, vans, trucks, airplanes, trains and the like. Accordingly, any reference herein to the vehicle or mobile 100 should also be considered to apply equally to other transportation vehicles including trailers that must be coupled to another vehicle to be transported.

In one alternate embodiment a trailer includes all of the components of the payload portion of the CAD Mobile. The trailer does not include a cab portion in this embodiment. A single generator provides power in lieu of the vehicle engine and alternator and generator. The trailer has a hitch for coupling the trailer to a vehicle in order to two the trailer and the CAD Mobile from job site to job site.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A mobile computer aided design apparatus comprising:
a vehicle for transporting equipment including a generator and a rear box, the rear box comprising a:
a computer aided design workstation;
a router coupled to the computer aided design work station, the router having a plurality of wireless communication transceivers for communicating with an extranet to send and receive CAD files depending on which transceiver of the plurality of transceivers has the best communication link;
an antenna system coupled to the router having an operational frequency in accordance with each wireless communication transceiver of the plurality of wireless communications transceivers;
a plotter having a drum that is lockable for transport, the plotter coupled to the workstation for printing CAD files;
a uninterruptible power supply for powering the computer aided design work station and the router, and coupled to the generator.

2. The apparatus of claim 1, wherein the plurality of wireless communication transceivers include a cellular phone transceiver, an 802.11 compliant transceiver, a satellite communication transceiver, a stratellite communication transceiver.

3. The apparatus of claim 1, further comprising an internal toner cleaning system coupled to the plotter.

4. The apparatus of claim 3, wherein the internal toner cleaning system is a vacuum system coupled to the plotter to remove excess toner from a portion of the plotter surrounding the drum.

5. The Apparatus of claim 3, wherein the internal toner cleaning system is activated when the vehicle starts in motion.

6. The apparatus of claim 1, wherein the antenna system comprises a cellular phone antenna, an 802.11 transceiver antenna and a satellite transceiver antenna.

7. The apparatus of claim 1, further comprising an Ethernet switch coupled between the router and the computer aided design workstation.

8. The apparatus of claim 1, further comprising a dedicated alternator coupled to the plotter imaging heat elements.

9. The apparatus of claim 1, wherein the router has the capability to switch between a plurality of wireless communication systems during data transfer.

10. The apparatus of claim 9, wherein the switching from a first system to a second system is a manual operation or an automatic operation.

11. The apparatus of claim 10, wherein the automatic switch operation is based on a script that reduces data transfer charges.

12. The apparatus of claim 1, further comprising a module capable of uploading and downloading data simultaneously from the CAD mobile.

13. The apparatus of claim 1, wherein a first electronic portion of the plotter is coupled to an AC power supply and a second electronic portion of the plotter is coupled to a DC power supply.

14. A mobile CAD system comprising:
a vehicle having a payload portion;
a CPU module carried in the payload portion;
a memory module coupled to the CPU module an carried in a bay of the payload portion;

a wireless communication module coupled to the CPU module;

a monitor coupled to the CPU module;

an uninterruptible power supply coupled to the CPU module, the wireless communication module, and the monitor;

an antenna array coupled to the wireless communication module;

a first generator;

a second generator;

an inverter coupled to the first generator;

a power source switch coupled between the inverter and the second generator;

a cut-off switch coupled between a first batter and a fuse and the cut-off switch coupled between a second battery and the inverter; and a plotter coupled to the workstation and fixtured to the payload portion.

15. A method for operating a CAD station comprising:

providing a vehicle to transport a CAD system, the CAD system comprising:

a CPU having a monitor, a wireless interface coupled to the CPU, a plotter with a lockable drum, the plotter coupled to the CPU;

arriving at a desired location;

receiving CAD data associated with the location;

modifying the CAD data;

printing a copy of the CAD data from there plotter; and uploading the changes to a central database from the vehicle.

16. The method of claim 15 further comprising the steps of coupling the vehicle to a motor vehicle, the motor vehicle to transport the vehicle from location to location.

17. The method of claim 15, wherein the vehicle is a trailer with a hitch.

18. The method of claim 15, wherein the vehicle is a motor vehicle, a portion of which is used to carry the CAD station, the plotter.

* * * * *